United States Patent [19]

Feltz et al.

[11] Patent Number: 4,876,857
[45] Date of Patent: Oct. 31, 1989

[54] SHUT OFF/PRESSURE REGULATING VALVE FOR TURBINE ENGINE

[75] Inventors: Kevin L. Feltz, New Carlisle; Glenn A. Richardson; Jonathan C. Burrell, both of South Bend, all of Ind.

[73] Assignee: Allied-Signal Inc., Morristown, N.J.

[21] Appl. No.: 233,106

[22] Filed: Aug. 15, 1988

[51] Int. Cl.$^4$ .............................................. F02C 7/232
[52] U.S. Cl. .................. 60/734; 137/516.29; 137/538
[58] Field of Search ............... 60/39.094, 39.281, 734, 60/740, 741; 137/516.29, 492, 538

[56] References Cited

U.S. PATENT DOCUMENTS

| | | | |
|---|---|---|---|
| 3,085,588 | 4/1963 | Oliphant et al. | 137/516.29 |
| 3,092,133 | 6/1963 | Clark | 137/538 |
| 3,294,111 | 12/1966 | Abercrombie et al. | 137/492 |
| 3,339,574 | 9/1967 | Erb et al. | 60/39.29 |
| 4,760,696 | 8/1988 | Rooks et al. | 60/734 |

Primary Examiner—Louis J. Casaregola
Attorney, Agent, or Firm—Leo H. McCormick, Jr.; Ken C. Decker

[57] ABSTRACT

A shut off and pressure regulator valve (10) for use with a metering valve (12) in a fuel system for a turbine engine. A pressure responsive piston (70) freely moves in a sleeve (48) to initiate fluid communication between an inlet port (16) and an outlet port (24). In response to a predetermined pressure differential a seal (90) carried by the piston (70) engages a ramp (56) to prevent fluid communication through the operational clearance (x) between the piston (70) and sleeve (48) to prevent fluid communication of a control fuel from a control chamber (76) to the outlet port (24) connected to the turbine engine.

7 Claims, 3 Drawing Sheets

FIG. I

SHUT OFF/PRESSURE REGULATING VALVE FOR TURBINE ENGINE

This invention relates to a shut off/pressure regulating valve for a turbine engine. The valve has a shuttle piston which moves in a sleeve in response to a pressure differential between an operational fuel and a control fuel to allow operational fuel to flow from an inlet port to a outlet port through radial openings in the sleeve. In response to a predetermined pressure differential, a resilient member moves the piston past the radial openings to interrupt fluid communication through these openings. A seal carried by the piston engages a ramp on the sleeve and face on the piston engages a seal on a seat member to prevent fluid communication from the inlet port and a control port to the outlet port through the clearance between the piston and sleeve to thereafter completely interrupt the communication of fuel to the turbine engine.

In fuel systems for use in supplying a turbine engine in an aircraft in order to provide accurate pressure regulation it is important that the components operate in a substantially friction free manner. In known shut off valves, a shuttle piston moves in a bore to engage a seat and to thereafter terminate the flow of operational fuel to a turbine engine. Unfortunately, under some circumstances the operational clearance required to permit friction free shuttle piston movement is such that a small amount of fuel may still flow through the outlet port to the turbine engine. While this amount of fuel is not large, it does contribute to a delay in shutting down a turbine engine. In addition, over a period of time this small amount of fuel can fill the burners while in a shut down state. There are drip light seal designs which provide friction free operation of a shuttle piston but require a time consuming shimming operation during assembly.

While retaining the relatively friction free operation of the shuttle piston we have developed a sealing arrangement for a shut off valve whereby the operational clearance is sealed during an inoperative condition. In this invention, a first stationary seal is retained in a seat member and a second seal is carried by the shuttle piston. When the shuttle piston is moved toward a shut off position, the second seal engages a ramp on a sleeve and initiates closure of the clearance between the shuttle piston and the sleeve. When the shuttle piston engages the first seal, the clearance is completely sealed and flow communication to the outlet port through the shut off valve sealed to completely terminate the flow of fuel from a metering valve to the turbine engine.

It is an object of this invention to provide a shut off valve with a sealing arrangement to prevent the flow of fuel to a turbine engine along a flow path created by the operational clearance between a shuttle piston and a sleeve member when the shuttle piston is located in a shut off position.

An advantage of this invention occurs through a sealing arrangement which effectively prevents the flow of fuel in a shut off position but does not restrict essentially friction free operational movement of the pressure regulating piston.

A further advantage of this invention occurs through the use of a sleeve having a series of radial openings located a distance away from a seat to define a flow path which reduces the possibility of erosion of the seal caused by the flow of fuel through a shut off valve.

These advantages and objectives should be apparent from reading this specification while viewing the drawings wherein.

Figure 1:
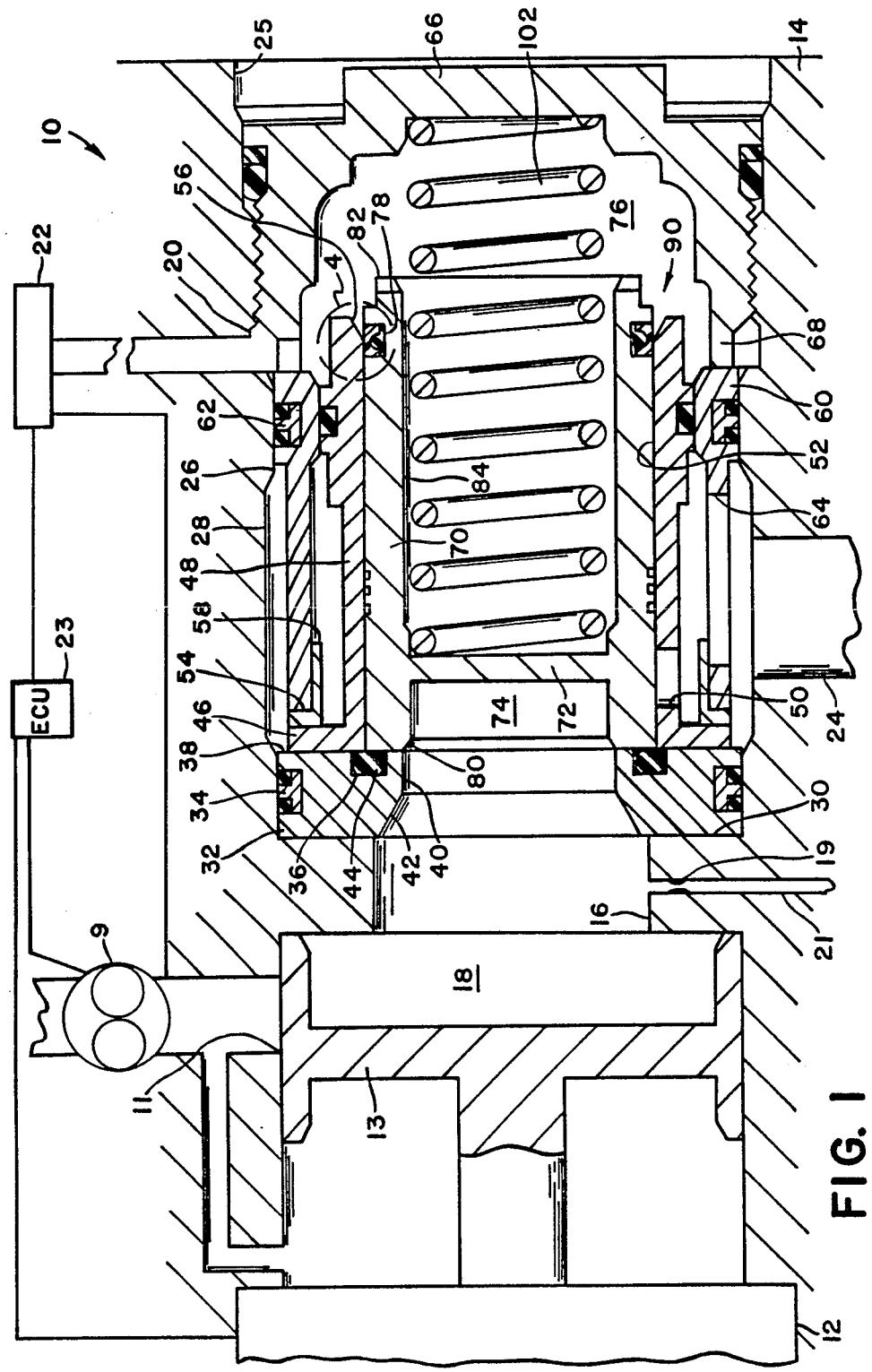
FIG. 1 is a sectional view of a shut off valve made according to the principles of the invention whereby the flow of fuel to a turbine may be completely terminated.
Figure 2:
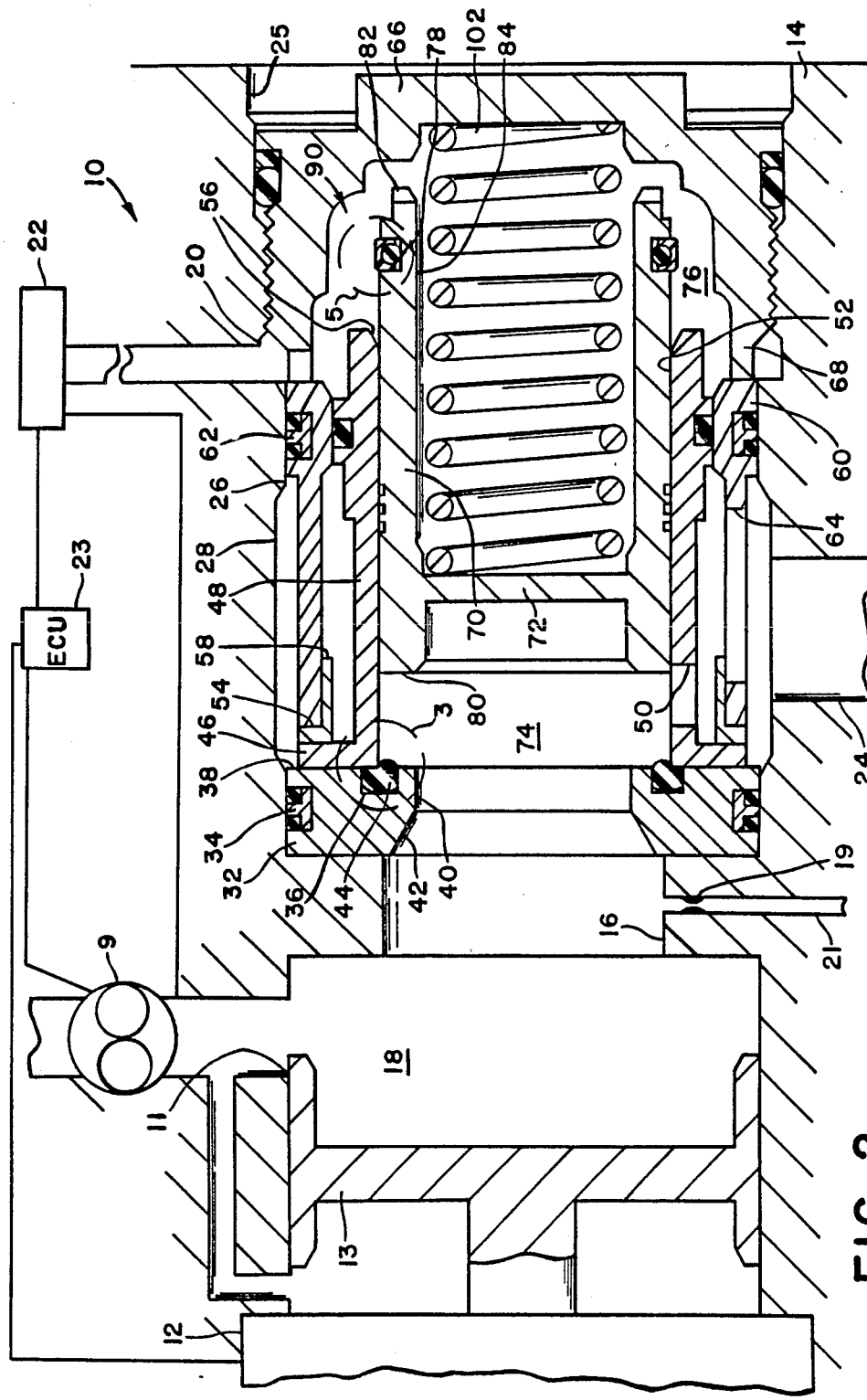
FIG. 2 is a section view of the shut off valve of FIG. 1 illustrating fuel flow therethrough from a metering valve to a turbine.
Figure 3:
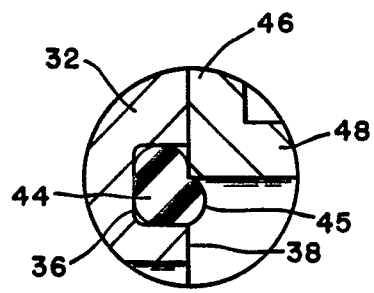
Figure 4:
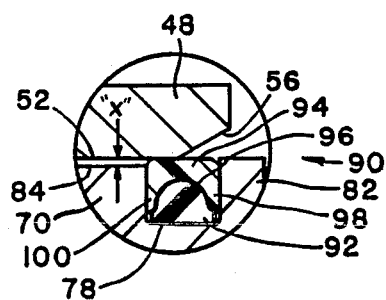
Figure 5:
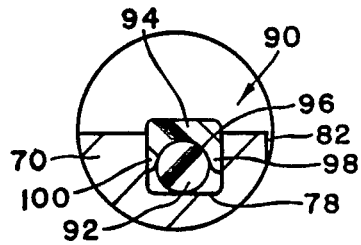

FIG. 3 is an enlarged view of circumscribed section 3 in FIG. 2 illustrating an end seal; FIG. 4 is an enlarged view of circumscribed section 4 in FIG. 1 illustrating the engagement of a ramp of a sleeve with an annular seal positioned in a groove in a shuttle piston; and FIG. 5 is an enlarged view of circumscribed section 5 in FIG. 2 illustrating the annular seal in FIG. 4 in a released or free state.

The shut off valve 10, shown in FIG. 1 is designed to be included in a fuel system for a turbine engine of an aircraft. The shut off valve is located down stream from a metering valve 12 which is controlled by an input from a electronic control unit (ecu) in the aircraft.

The shut off valve 10 has a housing 14 with an inlet port 16 connected to an outlet chamber 18 of the metering valve 12, a control port 20 connected to receive control fuel from a regulator 22, and an outlet port 24 connected to the turbine engine. Housing 14 has a bore 26 that extends from an opening 25 to a shoulder 30 adjacent the inlet port 16. Housing 14 has an annular groove 28 which forms a smooth entry for fluid from the bore 26 into the outlet port 24.

An annular seat member 32 located in bore 26 adjacent shoulder 30 has a peripheral seal 34 which engages bore 26 and an annular groove 36 located on a face 38. An axial opening 40 in seat member 32 has a tapered surface 42 to provide for a smooth transition for fuel from supply chamber 18 of the metering valve 12 into bore 26.

A cylindrical seal member 44 is located in groove 36 of the seat member 32. After a flange 46 on a first end of sleeve 48 engages seal member 44, as best shown in FIG. 3, about 15 percent of seal member 44 protrudes past face 38.

In addition to flange 46, sleeve 48 has a plurality of radial openings 50 (only one is shown) located adjacent the flange 46. Openings 50 are located a sufficient distance from axial opening 40 to reduce the creation of turbulence that could erode the seal 44 during the communication of fuel to outlet port 24. Sleeve 48 which extends into bore 26 past the control port 20 has a tapered surface 56 on a second end. Tapered or sloped surface 56 extends from the interior surface 52 of the sleeve 48.

An annular guide 54 which engages flange 46 has a cylindrical section 58 that extends past opening 50 in the sleeve 48 to deflect fuel flow from the openings 50 toward the outlet port 24. In addition, the deflection of fuel by cylindrical section 58 prevents cavitation in the fuel due to an extreme pressure drop across openings 50 from eroding bore 26.

A cylindrical member 60 has a seal 62 which engages bore 26 and a plurality of openings 64 that empty into annular groove 28.

An end cap 66 which screws into housing 14 to close opening 25 to seal bore 26. End cap 66 has an end 68 that engages cylindrical member 60 to hold sleeve 48 against seat 32.

A shuttle piston 70 located in sleeve 48 has a wall 72 which separates bore 26 into an operational chamber 74 and a control chamber 76. Shuttle piston 48 has a first end 80 and a second end 82. A groove 78 located on the peripheral surface 84 of piston 70 retains a seal member 90. The diameter of the shuttle piston 70 is such that peripheral surface 84 is less than the interior surface 52 of sleeve 48. The difference in diameters or clearance is exaggerated and illustrated by "x" shown in FIG. 4.

Seal member 90, as best shown in FIGS. 4 and 5, has a first section made up of annular rubber ring 92 and a second section made up of a plastic retainer 94. Retainer 94 has a semi-spherical socket 96 with legs 98 and 100 that engage the side walls of groove 78 in shuttle piston 70.

A spring 102 located between the end cap 66 and wall 72 acts on and moves the shuttle piston 70 into engagement with seat 32 in a manner shown by the position of the components in FIG. 1 during a shut off condition for a turbine.

In the shut down condition shown in FIG. 1, the control fluid from regulator 22 is operational fuel communicated to control chamber 76. Piston 13 associated with metering valve 12 is moved past opening 11 from the supply pump 9 to interrupt the flow of fuel into supply chamber 18. Restrictive orifice 19 in bleed passage 21 allows fuel to flow from supply chamber 18. The fluid pressure in supply chamber 18 is reduced to a level that is less than the operational control fuel from regulator 22 and thus a closure pressure differential is created across wall 72. This pressure differential and spring 102 move shuttle piston 20 into engagement with seat member 32. When the first end 80 of shuttle piston 70 moves from a position, as shown in FIG. 2, past opening 50 in sleeve 48 the flow of fuel from the supply chamber 18 of metering valve 12 essentially terminates. However, control fluid in chamber 76 and supply fuel in chamber 18 may still flow through clearance "x" to opening 50. As spring 102 moves piston 70 toward seat member 32, retainer 94 initially engages and thereafter moves down ramp 56 causing the o-ring seal 92 to flatten out in a manner shown in FIG. 4 to prevent operational fuel from flowing from the control chamber 76 to the outlet port 24. When end 80 of shuttle piston 70 engages face 38 on seat member 32, protrusion 45 on seal 44 is compressed into groove 35 to prevent communication of operational fuel from chamber 74 through the clearance "x" to the outlet port 24.

In this simplified illustration of the invention when an operator provides an ecu 23 with an operational input corresponding to an operational requirement of the turbine, the metering valve 12 is activated and piston 13 moved past port 11 to allow fuel to flow into supply chamber 18. When the fluid pressure in supply chamber 18 and the fluid pressure in control chamber 26 reach a predetermined pressure differential, spring 102 is overcome and piston 70 moves away from seat 32, as shown in FIG. 2. Piston 70 must move a preset distance before end 80 moves past openings 50 in sleeve 48 to allow operational fuel to flow through the outlet port 24 to the turbine Prior to uncovering of openings 50, seal 90 moves out of engagement with ramp 56 and o-ring 92 assumes the shape shown in FIG. 5. The operational pressure differential continually moves piston 70 to regulate and maintain the fluid pressure in supply chamber 18 within a desired range. In this situation piston 70 is essentially floating on a surface of control fluid located in the clearance "x" such that frictional resistance to movement of the piston 70 is eliminated or negligible.

Once end 80 of piston 70 moves past openings 50, the metering valve 12 controls the quantity of operational fuel that is supplied to the turbine. However, the guide surfaces 58 and spacing of the opening 50 in the sleeve 48 and openings 64 in cylindrical member 60 cooperate to prevent the removal of seal 44 from groove 36 in the seat member 32.

When the operator desires to shut down the turbine, a control member is moved to a shut off position. The ecu 23 provides the metering valve 12 with an input that moves piston 13 to close port 11. After port 11 closes fluid from supply chamber 18 flows to the outlet port 24 until the pressure differential across wall 72 is reduced such that spring 102 can moves piston 70 against face 38 of seat 32 and sea 90 into engagement with ramp 56 to completely terminate fuel flow through outlet port 24 as shown in FIG. 1. Since some fuel may flow past closed port 11 into supply chamber 18, orifice 19 allows such fuel to flow to the return through port 21 to prevent pressure build up such that spring 102 would be overcome and shuttle piston 70 moved away from seat member 23. The size of orifice 19 is selected to have essentially no effect on the development of fluid pressure in supply chamber 18 once piston 13 moves past port 11. Thus, once fuel from pump 9 flows into supply chamber 18 a pressure differential is created such that piston 70 is moved to a position as shown in FIG. 2 where fuel is supplied to a turbine.

We claim:

1. A shut off and pressure regulator valve for use with a metering valve in a fuel system for a turbine engine, comprising:

a housing having a bore therein with an inlet port connected to receive operational fuel under pressure, a control port connected to receive control fuel and an outlet port connect to provide said turbine with operational fuel, said bore having a shoulder located between said inlet and outlet ports;

a seat member located adjacent said shoulder and having a first face with an annular groove;

a first seal member located in said annular groove;

a sleeve member located in said bore having a flange on a first end that retains said first seal member in said annular groove and a ramp on a second end, said sleeve member having a plurality of radial openings, through which said bore is connected to said outlet port;

a piston located in said sleeve for separating said bore into a control chamber and a supply chamber, said piston having a first end exposed to said operational fuel in said supply chamber and a second end exposed to control fuel in said control chamber, said piston responding to a pressure differential between said operational fuel and control fuel by moving to allow operational fuel to flow through, said radial openings in said sleeve to said outlet port, said piston having a peripheral groove adjacent said second end;

a second seal member located in said peripheral groove;

an end cap fixed to said housing for engaging said sleeve member to hold said seat member against said shoulder; and resilient means located between said end cap and piston for urging said first end of said piston toward said seat member in opposition to said pressure differential, said resilient means overcoming a predetermined pressure differential by initially moving said first end of said piston past said radial openings in said sleeve to substantially terminate communication of operational fluid to said outlet port and thereafter moving said second seal member into engagement with said ramp on said sleeve, said second seal member moving down the ramp to prevent fluid communications of control fuel from said control chamber to said outlet port along a first flow path crated by the operational clearance between said piston and sleeve, said first end of said piston moving into engagement with said first seal member to prevent communication of operational fuel to said outlet port along a second flow path created by the operational clearance between said piston and sleeve to thereafter totally interrupt communication of fuel to said outlet port and correspondingly said turbine engine.

2. The shut off and pressure regulator valve as recited in claim 1, further including:
  a protective cap which surrounds said second seal member to prevent damaging the peripheral surface of said second seal member on engagement with said ramp.

3. The shut off and pressure regulator valve as recited in claim 1 further including:
  a protective cap which surrounds said second seal member to retain the second seal member in said peripheral groove.

4. The shut off and pressure regulator valve as recited in claim 1, wherein said sleeve member includes:
  a first cylindrical member located in said bore and engaging said flange on said sleeve; and
  a second cylindrical member located in said bore between said first cylindrical member and end cap, said second cylindrical member having a plurality of radial openings through which said openings in said sleeve are connected to said outlet port, said first cylindrical member having a guide surface for directing fluid communication from said openings in said sleeve to said outlet port through said radial openings in said second cylindrical member without the creation of flow turbulences.

5. The shut off and pressure regulator valve as recited in claim 4, wherein said clearance between said piston and sleeve allows said piston to freely move in response to said pressure differential without substantial friction resistance.

6. The shut off and pressure regulator valve as recited in claim 5 wherein said first end of said piston moves away from said first seal member a predetermined distance prior to initiating flow communication through said radial openings in said sleeve to reduce any wear of said first seal that could be caused by the flow of fluid to said outlet port.

7. The shut off and pressure regulator valve as recited in claim 6, wherein said sleeve extends past said control port to reduce the introduction of radial forces on said piston by the communication of control fuel to said control chamber.

* * * * *